US010156311B2

(12) United States Patent
Schroder

(10) Patent No.: US 10,156,311 B2
(45) Date of Patent: Dec. 18, 2018

(54) LENGTH-ADJUSTABLE ADAPTER DEVICE FOR CONNECTING A SYSTEM PART OF A PLASTICS PROCESSING SYSTEM TO A PIPELINE

(71) Applicant: NORDSON HOLDINGS S.A.R.L & CO. KG, Erkrath (DE)

(72) Inventor: Christian Schroder, Munster (DE)

(73) Assignee: Nordson Corporation, Westlake, OH (US)

( * ) Notice: Subject to any disclaimer, the term of this patent is extended or adjusted under 35 U.S.C. 154(b) by 240 days.

(21) Appl. No.: 14/903,526

(22) PCT Filed: Jul. 8, 2014

(86) PCT No.: PCT/EP2014/064653
§ 371 (c)(1),
(2) Date: Jan. 7, 2016

(87) PCT Pub. No.: WO2015/004159
PCT Pub. Date: Jan. 15, 2015

(65) Prior Publication Data
US 2016/0158989 A1 Jun. 9, 2016

(30) Foreign Application Priority Data

Jul. 9, 2013 (DE) .................... 20 2013 103 050 U

(51) Int. Cl.
*F16L 51/00* (2006.01)
*F16L 27/12* (2006.01)
(Continued)

(52) U.S. Cl.
CPC ............... *F16L 51/00* (2013.01); *F16L 27/12* (2013.01); *B29C 45/58* (2013.01); *B29C 47/08* (2013.01);
(Continued)

(58) Field of Classification Search
CPC ....... F16L 51/00; F16L 27/12; F16L 19/0231; B29C 47/08; B29C 47/0864;
(Continued)

(56) References Cited

U.S. PATENT DOCUMENTS 1,319,457 A * 10/1919 Bogart .................... F16L 27/12
285/298 X
2,445,580 A * 7/1948 Kasten .................... F16L 27/12
285/302
(Continued)

FOREIGN PATENT DOCUMENTS

CN 201348102 Y 11/2009
CN 102135211 A 7/2011
(Continued)

OTHER PUBLICATIONS

Chinese Patent Application No. 201480038981.7: First Office Action dated Nov. 1, 2016, 12 pages.
(Continued)

*Primary Examiner* — Greg Binda
*Assistant Examiner* — Zachary T Dragicevich
(74) *Attorney, Agent, or Firm* — Baker & Hostetler LLP

(57) ABSTRACT

A length-adjustable adapter device (100) for connecting a plastics melt filtering device (200) to a pipeline (300), having at least a housing connection element (10) which has at least one inner flow duct (13) in a pipe extension (12) which is provided with an external thread (14), an adjusting ring element (20) having an internal thread (24) for receiving the external thread (14) of the pipe extension (12) and a line connection element (30) for connecting to the pipeline (300) with a line ring flange (31) and with a pipe extension (32) having an inner flow duct (33). The line ring flange (31)
(Continued)

Figure 1:
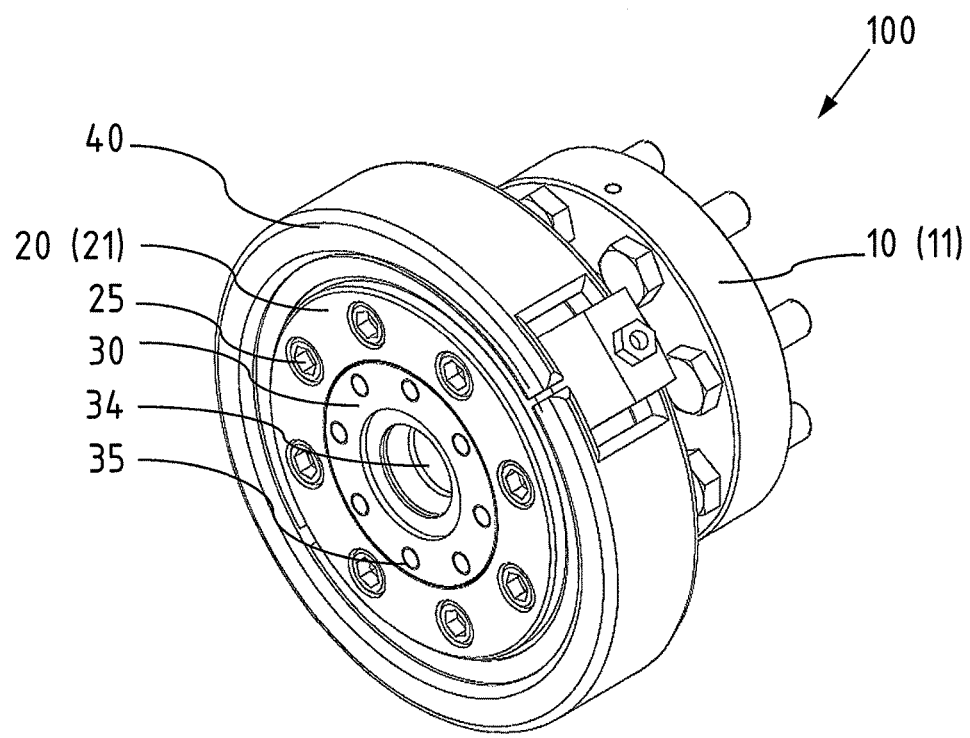

is rotatable in a receiving groove (23) of the adjusting ring element (20) and is fixed in a form-fitting manner against axially acting forces.

15 Claims, 5 Drawing Sheets

(51) Int. Cl.
  *B29C 45/58* (2006.01)
  *B29C 47/68* (2006.01)
  *B29C 47/08* (2006.01)
  *B29C 47/36* (2006.01)
  *B29C 47/86* (2006.01)
  *F16L 19/02* (2006.01)

(52) U.S. Cl.
  CPC ...... *B29C 47/0818* (2013.01); *B29C 47/0864* (2013.01); *B29C 47/0866* (2013.01); *B29C 47/364* (2013.01); *B29C 47/367* (2013.01); *B29C 47/68* (2013.01); *B29C 47/862* (2013.01); *F16L 19/0231* (2013.01)

(58) Field of Classification Search
  CPC .............. B29C 47/0818; B29C 47/862; B29C 47/0866; B29C 47/367; B29C 47/364; B29C 47/68; B29C 45/58
  USPC .................................................. 285/298, 302
  See application file for complete search history.

(56) References Cited

U.S. PATENT DOCUMENTS

| | | | |
|---|---|---|---|
| 5,098,132 A * | 3/1992 | Burton | F16L 27/12 |
| 8,240,719 B2 * | 8/2012 | Udhofer | |
| 2008/0187300 A1 * | 8/2008 | Scarzella | |
| 2008/0309068 A1 * | 12/2008 | Hall | F16L 27/12 |
| 2010/0113653 A1 | 5/2010 | Ueda | |
| 2011/0169258 A1 | 7/2011 | Nowak et al. | |
| 2013/0175039 A1 * | 7/2013 | Guidry | F16L 27/12 |

FOREIGN PATENT DOCUMENTS

| | | |
|---|---|---|
| JP | 03-082521 A | 4/1991 |
| JP | 09-242950 A | 9/1997 |
| JP | 11-173472 A | 6/1999 |
| JP | 2001-138379 | 5/2001 |
| JP | 2008-080577 A | 4/2008 |
| JP | 4600672 B2 | 12/2010 |
| WO | 2006012598 A1 | 2/2006 |
| WO | 2014042643 A1 | 3/2014 |

OTHER PUBLICATIONS

JP Decision to Grant dated Mar. 26, 2018 for JP Application No. 2016524802.

* cited by examiner

LENGTH-ADJUSTABLE ADAPTER DEVICE FOR CONNECTING A SYSTEM PART OF A PLASTICS PROCESSING SYSTEM TO A PIPELINE

CROSS-REFERENCE TO RELATED APPLICATIONS

This application is the National Stage of International Application No. PCT/EP2014/064653, filed Jul. 8, 2014, which claims the benefit of DE Application No. 20 2013 103 050.3, filed Jul. 9, 2013, the disclosures of which are incorporated herein by reference in their entireties.

The invention relates to a length-adjustable adapter device for connecting a system part of a plastics processing system to a pipeline.

In plastics filtering devices, plastic as a highly viscous medium is pressed through filtering media in order to separate off foreign bodies or agglomerates. This particularly involves thermoplastics in molten form. The filtering devices are inserted for this purpose into a production line of a plastics processing system which extends between an extruder or a melt pump and a processing unit connected downstream of the filtering device. Pipelines having a sufficient diameter have to be used in said line in order to be able to convey plastics melts in a manner corresponding to the throughput of the processing unit. The connections have to be designed to be stable and tight because of the high pressures. The connection therefore customarily takes place with pipeline elements which are provided with flange rings on the end side in order to be able to produce a fixed screw connection to the assemblies to which said pipeline elements are connected. Said flanges also have centring means on the end side in order to achieve precise positioning, but also in order to bring about good tightness by means of the centring aids engaging one in another in a form-fitting manner. For the centring means, one of the parts which are to be connected to each other has an offset, a groove or the like in which a corresponding projection or an annular web on the counterpart can engage. On account of the parts engaging one in another in a form-fitting manner, a certain axial displacement distance is required for installation and removal, in order to be able to release the centring means. It is therefore not possible to release an individual unit, such as, in particular, the abovementioned plastics filtering device, laterally from the production line without previously having to displace adjacent assemblies axially to such an extent that the parts engaging in another for centring purposes can be disengaged and the connection is therefore released. On account of the large dimensions and the considerable weight of the system parts, the release of individual assemblies for maintenance and repair purposes is therefore highly time-consuming. The mounting of all of the connected system parts on linear guides is possible in principle, but is cost- and maintenance-intensive.

It is the object of the present invention to specify a length-adjustable adapter device with which a certain axial compensation for length is possible in order to be able to release the form-fitting centring means without having to move adjacent units.

This object is achieved by a length-adjustable adapter device with the features of Claim 1.

The adapter device according to the invention essentially makes provision for the respective pipe extensions on two opposite elements to be inserted one in the other. The pipe extension having the smaller diameter is inserted into the inner bore in the other pipe extension and expands toward the end thereof, in particular in a funnel-shaped manner, in order to keep flow resistances at the transition point as small as possible.

The sealing can be undertaken via sealing rings which are fitted between the smaller pipe extension and the bore in the pipe extension of larger diameter. The pipe extensions inserted one in the other are provided with a loose fit in order to be able to be adjusted axially even in the event of corresponding thermal expansions. The connecting pipes engaging one in the other would already be sufficient in order simply to form a length-adjustable flow path if said connecting pipes are supported on the adjacent assemblies to which they are screwed. However, the adapter device according to the invention also provides coupling via an outside diameter to the one connecting pipe and an adjusting ring with an internal thread in order to be able to apply axial forces and, by shortening the length of the adapter device, to be able to undertake a removal, even in the event of clogging or other blockades, by large forces being exerted via the thread.

As already explained, the distance between the flanges on the end sides is brought about, according to the invention, via an internal thread on the adjusting ring and an external thread on the pipe extension of the housing connection element. In order to decouple the rotational movement of the adjusting ring required for the adjustment from the line connection element, which is provided only for the axial adjustment, a connection is provided between the line connection element and the adjusting ring element, which connection does permit rotation relative to each other, but at the same time brings about form-fitting fixing in relation to axially acting forces.

This is brought about by a receiving groove in the inner bore of the adjusting ring element, in which a compatible step on the outer circumference of the line connection element engages. If the adjusting ring is rotated, said adjusting ring can rotate freely around the ring flange of the line connection element. Since the latter at the same time changes the axial position thereof in the process, the adjusting ring element correspondingly pushes the line connection element forwards or back in the axial direction.

The adapter device according to the invention has the advantage of not requiring any lock elements. The flange elements on the end sides are in each case connected fixedly to the adjacent constructional units and are for their part thereby fixed in space. The sealtightness is provided via the connecting pipes inserted one into the other, in the case of a correspondingly carefully designed fit or provision of suitable sealing elements. The adjusting ring element is not absolutely required in order to apply prestresses or to maintain stresses in order to achieve sealing, although it may also be suitable for this purpose. It is merely required for installation and removal in order to be able to set the relative position of the two connecting pipes with respect to each other for said operations and to be able to overcome high adhesive forces.

The outer side of the adjusting ring preferably contains an exposed spanner surface or, in the case of larger diameters, engagement points for sickle spanners.

The end facing away from the plastics filtering device can preferably be additionally heated by an additional heating element, in particular an encircling heater band.

While the housing connection element is indirectly heated by means of heat conduction via the heated housing, in order to prevent freezing of the plastics melt, the heat conduction into the line connection element is at least reduced.

If the heat flow emerging from the filtering device housing through the housing connection element and via the contact surfaces on the thread turns engaging one in the other and also on the connecting pipes inserted one into the other should not be sufficient, the additional external heating means is required. Furthermore, the heating element can be used in order, by means of a temporary increase in the local temperature, to reduce the viscosity of the fluid in the adapter device and thereby to ensure the adjustability of the adapter device. This applies in particular to the stage at installation/removal where the connection on the one side, namely on the line connection element, to the adjacent heated units is already interrupted and further axial adjustability has to be undertaken in order to remove the centring projections engaging one in the other in a form-fitting manner from one another. At this stage, the heat conduction from the adjacent unit into the line connection element has already been interrupted, and therefore, during a relatively long installation duration, the melt still in the adapter device could solidify and further adjustability of the adapter device would no longer be provided.

The same applies during installation and during start-up again. In this case, the unit pulled out of the line is inserted back into the line and then has to be first heated once again in order to melt the frozen plastic and thereby to enable adjustment of the adapter device.

The housing connection element can either also be provided with a flange for the purpose of screwing to adjacent assemblies or it can be integrated directly in a system component of a plastics processing system such that only the connecting pipe protrudes therefrom.

Figure 2:
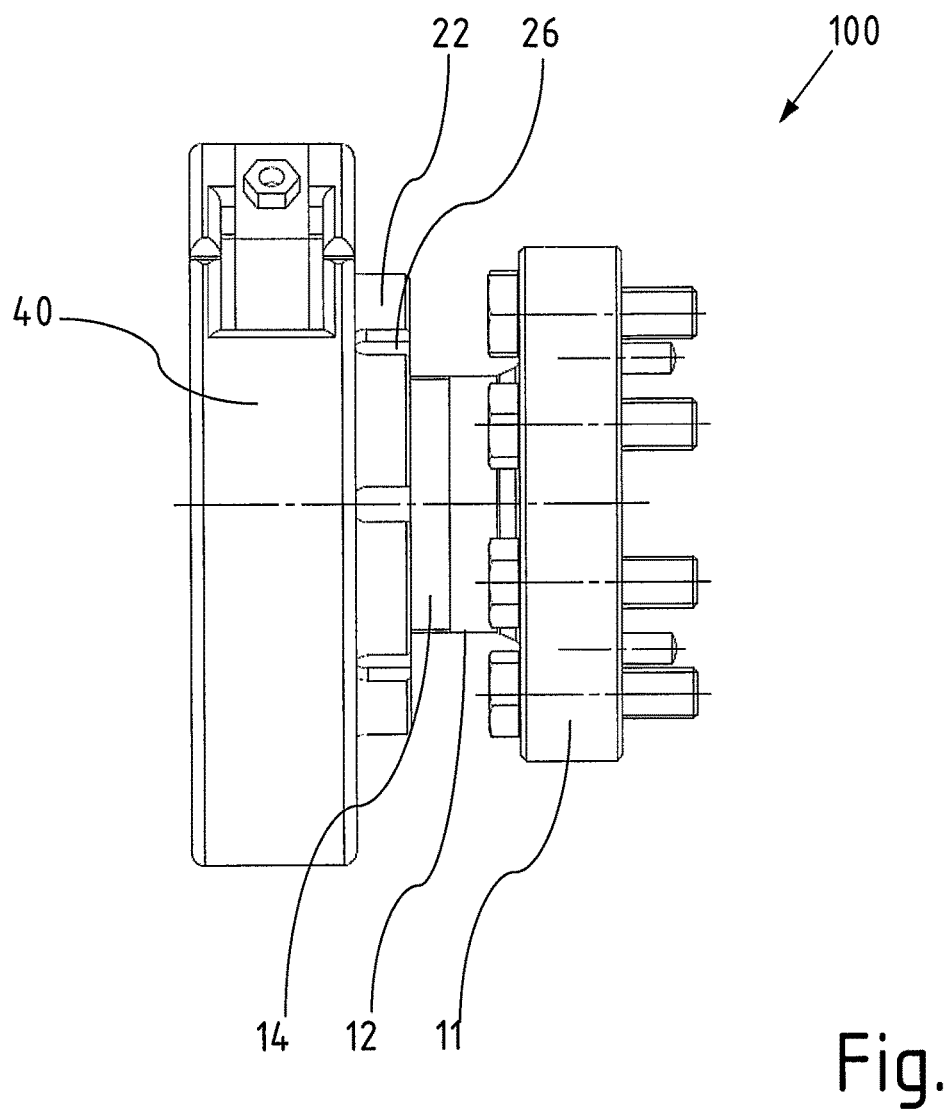
Figure 3:
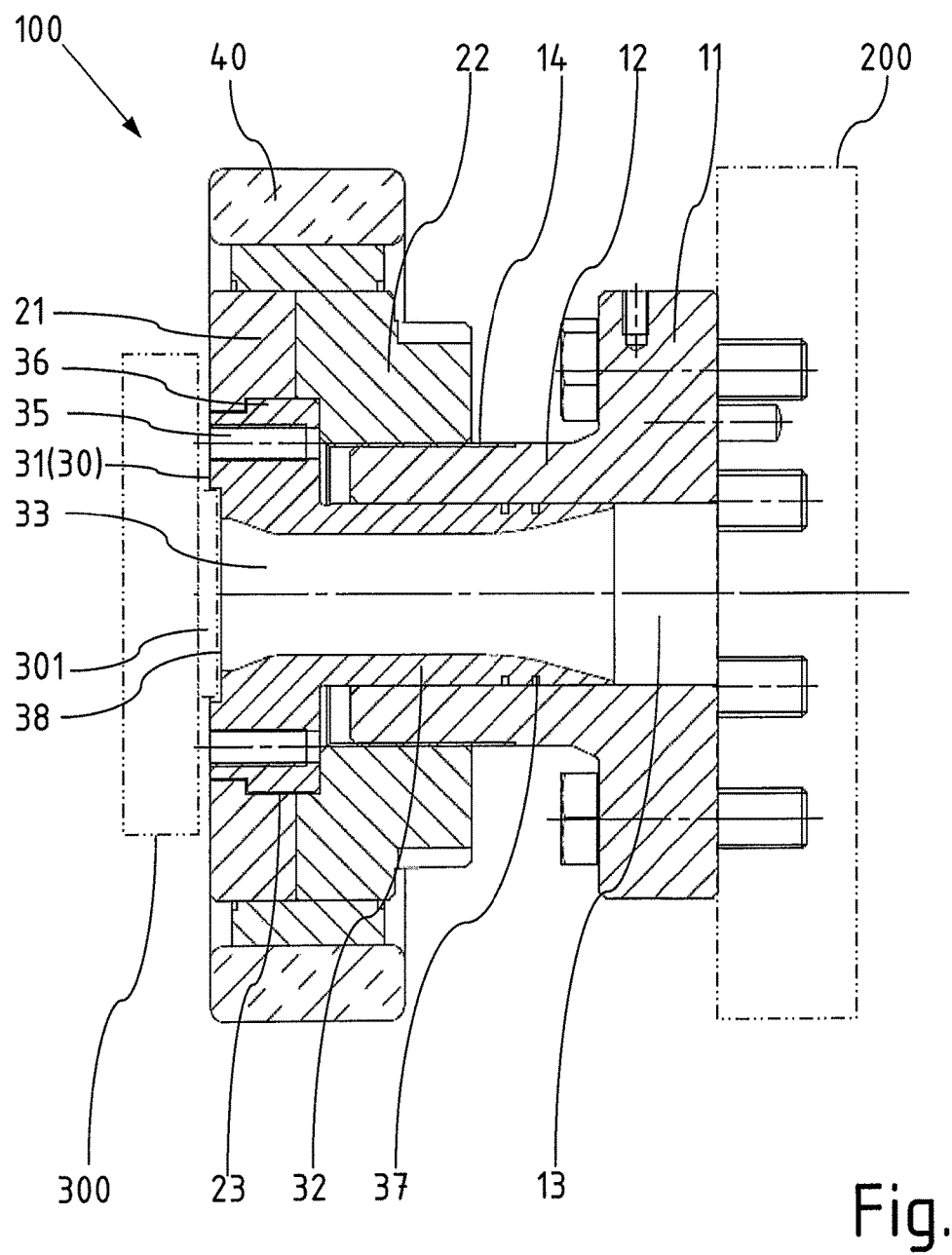
Figure 4:
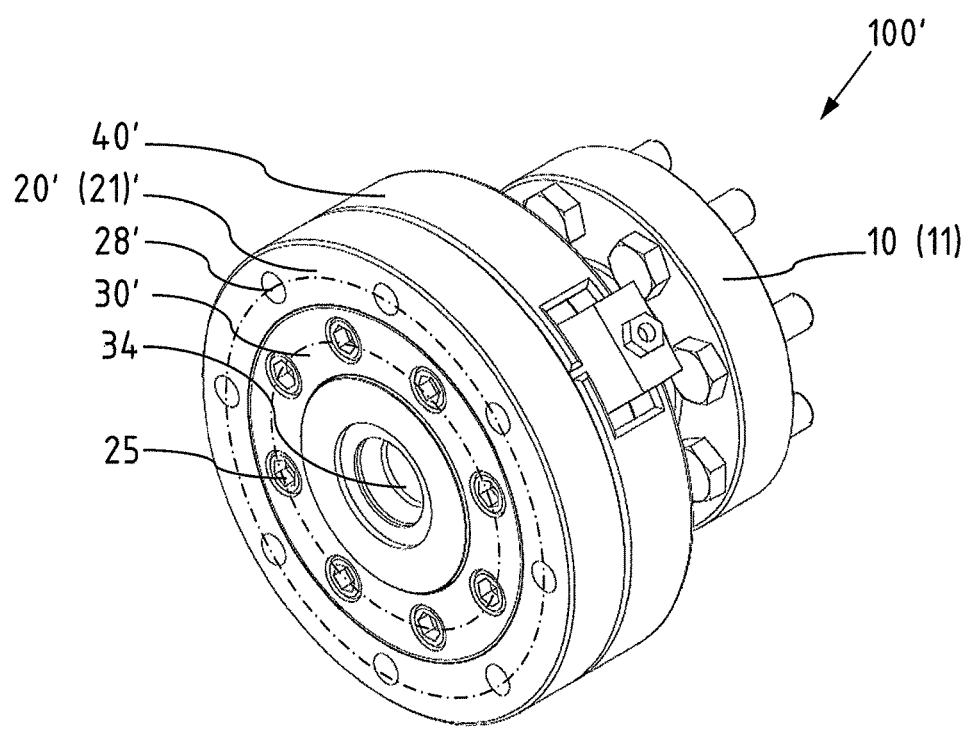

The invention is explained in more detail below with reference to the drawings. The drawings show in detail:

FIG. 1 an adapter device according to a first embodiment in a perspective view;

FIG. 2 the adapter device in a lateral view;

FIG. 3 the adapter device in a lateral sectional view;

FIG. 4 a second embodiment of an adapter device in a perspective view, and

Figure 5:
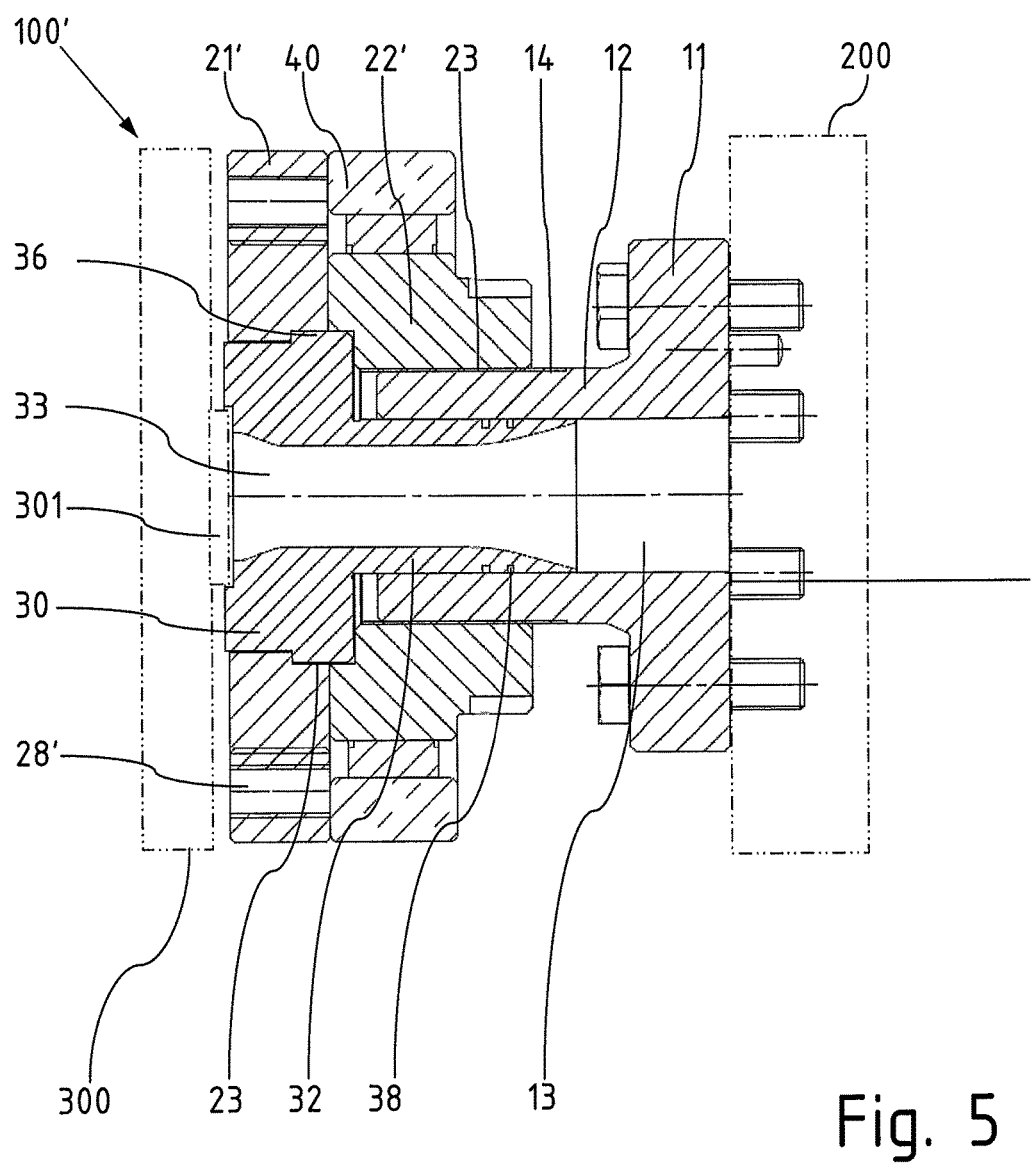

FIG. 5 the adapter device according to FIG. 4 in a lateral sectional view.

FIG. 1 shows an adapter device 100 according to a first embodiment with a housing connection element 10, of which the housing adapter ring 11 can be seen here, via which direct screwing to a plastics filtering device can be undertaken.

The other end, which faces the observer in FIG. 1, of the adapter device 100 has a line connection element 30 which has a multiplicity of threaded bores 35 via which the flange of a pipeline can be connected. In the interior, the line connection element 30 has a flow duct 34. The line connection element 30 is surrounded by an adjusting ring element 20 which consists of two half elements, of which the outer half element 21 can be seen here. The half elements are connected to each other via screw connections 25. A heating element 40 surrounds the adjusting ring element 20 and, when required, can bring about heating of the adjusting ring element 20 and, indirectly by the latter, also heating of the enclosed line connection element 30.

On the right-hand side, the lateral view in FIG. 2 shows the housing adapter ring 11 of the housing connection element 10 on the right-hand side and a part of the second half element 22 of the adjusting ring element, which part looks down under the heater band 40. The half element 22 has axial grooves 26 in order to be able to fit a sickle spanner and in order to be able to bring about an axial length adjustment by rotation of the adjusting ring element. A part of the pipe extension 12 of the housing connection element 10 is visible between the half element 22 and the housing adapter ring 11. The front part facing the adjusting ring element 20 is provided with an external thread 14.

The function of the adapter device 100 according to the invention becomes clear in particular from the sectional illustration in FIG. 3. The chain-dotted rectangle on the right-hand side indicates a system part 200 of a plastics processing system, which system part, in this exemplary embodiment, is screwed to the housing adapter ring 11. The pipe extension 12 having the external thread 14 adjoins the housing adapter ring 11. A continuous flow duct 13 is formed in the interior of the housing connection element 10.

The counterpart is formed on the left-hand side by the line connection element 30 which is connected to a flange 300 of a pipeline. It has a recessed receptacle 38 for a centring projection 301 on the flange 300 of the pipeline.

The line connection element 30 likewise has an internal flow duct 33 which merges into the flow duct 13 of the housing connection element 10. The flow duct 33 also passes through a pipe extension 32 which can be pushed in a precisely fitting manner into the flow duct 13. A tapering and re-expanding cross-sectional form is required for the flow duct 33 in order to configure the diameter transition in such a manner that as low flow resistances as possible occur.

The annular flange 31 of the line connection element 30 has threaded bores 35 and is provided on the outer circumference thereof with a step 36 which is accommodated in a receiving groove 23 of the adjusting ring element 20. In order to permit installation, the adjusting ring 20 consists of the half elements 21, 22 mentioned. The groove 23 extends via the plane of separation between the half elements 21, 22 or at least up to the latter. It is therefore possible, by release of the external screw connections 25 (compare FIG. 1), to remove the external half element 21 and then to be able to remove or reinsert the line connection element 30.

In a second embodiment of an adapter device 100', which is illustrated in FIG. 4 in a perspective view from the connection side for the pipeline, the construction substantially corresponds to the first embodiment according to FIGS. 1 to 3. The design of the adjusting ring element 20' and of the heater band 40' differs. Whereas, in the case of the first embodiment of an adapter device 100, the two half elements 21, 22 of the adjusting ring element 20 have the same outside diameter and are surrounded by a common heating element 40, in the case of the second embodiment of an adapter device 100', only the internal, second half element 22' is surrounded by a heater band 40.

The first half element 21' has an enlarged outside diameter such that an outer reference circle for a series of passage bores 28' for screw connections can also be provided thereon. The adapter device 100' is therefore not connected directly via threaded bores to a line connection element 30', but rather via passage or threaded bores 28' which lie on a second, outer reference circle.

The screw connections 25 which can be seen on a central reference circle in FIG. 4 also serve, as in the first embodiment of the adapter device 100', to connect the half elements 21', 22' to each other.

The functioning of the axial adjustability of this adapter device 100' substantially corresponds to that of the first embodiment 100. In this case too, a relative movement between the pipe extension 32 of the line connection element 30 and the pipe extension 12 of the housing connection element 10 can be forcibly brought about via the threaded connection between the adjusting ring 20' and the housing connection element 10. The sole difference is that the screw connection in the outer reference circle 28' has to be released beforehand for the rotation of the adjusting ring element 20'.

The invention claimed is:

1. A length-adjustable adapter device for connecting a plastics melt filtering device to a pipeline, the adapter device comprising:
   a housing connection element having at least one first inner flow duct in a first pipe extension having a reduced outside diameter, said first pipe extension having an external thread;
   an adjusting ring element having an internal thread configured to receive the external thread of the first pipe extension of the housing connection element; and
   a line connection element configured to connect to the pipeline with a line ring flange and with a second pipe extension having a second inner flow duct,
      wherein the line ring flange of the line connection element has a multiplicity of passage bores or threaded bores and is rotatable in a receiving groove of the adjusting ring element and is fixed in a form-fitting manner against axially acting forces,
      wherein the second pipe extension of the line connection element is partially pushed into the at least one first inner flow duct of the housing connection element,
      wherein the second inner flow duct and the first inner flow duct are configured to overlap, and
      wherein the adapter device is length-adjustable and configured to have a minimum length when the first and second inner flow ducts have a maximum overlap and a maximum length when the first and second inner flow ducts have a minimum overlap.

2. The adapter device of claim 1, wherein the adjusting ring element has a ring flange with a multiplicity of passage bores or threaded bores.

3. The adapter device of claim 1, wherein the adjusting ring element is formed from two half elements, and wherein the receiving groove for the line ring flange is formed in the plane of separation of the half elements.

4. The adapter device of claim 1, wherein the housing connection element comprises a housing adapter ring with a multiplicity of passage bores or threaded bores.

5. The adapter device of claim 1, wherein the adjustable ring element is configured to be moved in a first direction, such that the internal thread receives more of the external thread of the first pipe extension such that the length of the extension adapter device is decreased, and in a second direction opposite the first direction, such that the internal thread receives less of the external thread of the first pipe extension such that the length of the adapter device is increased.

6. The adapter device of claim 1, wherein the adjustable ring element and the first pipe extension are configured to have a maximum threaded configuration in which either the entirety of the external thread of the first pipe extension is received into the internal thread of the adjustable ring element or the entirety of the internal thread is engaged with the external thread, and
   wherein the maximum threaded configuration corresponds to the shortest length of the adapter device.

7. The adapter device of claim 1, wherein the adjustable ring element and the first pipe extension are configured to have a minimum threaded configuration in which a predetermined minimum amount of external thread is received in the internal thread, and
   wherein the minimum threaded configuration corresponds to the longest length of the adapter device.

8. A length-adjustable adapter device for connecting a plastics melt filtering device to a pipeline, the adapter device comprising:
   a housing connection element having at least one first inner flow duct in a first pipe extension having a reduced outside diameter, said first pipe extension having an external thread;
   an adjusting ring element having an internal thread configured to receive the external thread of the first pipe extension of the housing connection element; and
   a line connection element configured to connect to the pipeline with a line ring flange and with a second pipe extension having a second inner flow duct,
      wherein the line ring flange of the line connection element is rotatable in a receiving groove of the adjusting ring element and is fixed in a form-fitting manner against axially acting forces,
      wherein the second pipe extension of the line connection element is partially pushed into the at least one first inner flow duct of the housing connection element,
      wherein the second inner flow duct and the first inner flow duct are configured to overlap,
      wherein the adapter device is length-adjustable and configured to have a minimum length when the first and second inner flow ducts have a maximum overlap and a maximum length when the first and second inner flow ducts have a minimum overlap, and
      wherein the adjusting ring element is provided with at least one heating means.

9. The adapter device of claim 8, wherein the at least one heating means is formed by a heater band.

10. The adapter device of claim 8, wherein the adjusting ring element has a ring flange with a multiplicity of passage bores or threaded bores.

11. The adapter device of claim 8, wherein the adjusting ring element is formed from two half elements, and wherein the receiving groove for the line ring flange is formed in the plane of separation of the half elements.

12. The adapter device of claim 8, wherein the housing connection element comprises a housing adapter ring with a multiplicity of passage bores or threaded bores.

13. The adapter device of claim 8, wherein the adjustable ring element is configured to be moved in a first direction, such that the internal thread receives more of the external thread of the first pipe extension such that the length of the extension adapter device is decreased, and in a second direction opposite the first direction, such that the internal thread receives less of the external thread of the first pipe extension such that the length of the adapter device is increased.

14. The adapter device of claim 8, wherein the adjustable ring element and the first pipe extension are configured to have a maximum threaded configuration in which either the entirety of the external thread of the first pipe extension is received into the internal thread of the adjustable ring element or the entirety of the internal thread is engaged with the external thread, and
   wherein the maximum threaded configuration corresponds to the shortest length of the adapter device.

15. The adapter device of claim 8, wherein the adjustable ring element and the first pipe extension are configured to have a minimum threaded configuration in which a predetermined minimum amount of external thread is received in the internal thread, and wherein the minimum threaded configuration corresponds to the longest length of the adapter device.

* * * * *